United States Patent
Kato et al.

(10) Patent No.: US 6,626,571 B2
(45) Date of Patent: Sep. 30, 2003

(54) DUSTPROOF CONSTRUCTION FOR SLIDER UNIT

(75) Inventors: Masataka Kato, Gifu-ken (JP); Ikuhisa Miwa, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 09/983,803

(22) Filed: Oct. 25, 2001

(65) Prior Publication Data

US 2002/0047243 A1 Apr. 25, 2002

(30) Foreign Application Priority Data

Oct. 25, 2000 (JP) .......................... 2000-324869
Aug. 7, 2001 (JP) .......................... 2000-238572

(51) Int. Cl.$^7$ .............................................. F16C 29/06
(52) U.S. Cl. ........................................ 384/15; 384/45
(58) Field of Search ............................. 384/15, 45, 43, 384/44

(56) References Cited

U.S. PATENT DOCUMENTS

| | | | |
|---|---|---|---|
| 4,886,376 A | * 12/1989 | Osawa | 384/15 |
| 6,000,292 A | 12/1999 | Nagai et al. | |
| 6,012,846 A | * 1/2000 | Lambertz et al. | 384/15 |

FOREIGN PATENT DOCUMENTS

| | | |
|---|---|---|
| DE | 100 05 765 | 6/2001 |
| FR | 2 757 807 | 7/1998 |

OTHER PUBLICATIONS

Patent Abstracts of Japan; vol. No. 2000, No. 02, Feb. 29, 2000; & JP 11 325070 (Nippon Thompson Co., Ltd.); Nov. 26, 1999.

Patent Abstracts of Japan; vol. No. 2000, No. 02, Feb. 29, 2000; & JP 11 325069 (Nippon Thompson Co., Ltd.); Nov. 26, 1999.

* cited by examiner

Primary Examiner—Lenard A. Footland
(74) Attorney, Agent, or Firm—Browdy and Neimark, P.L.L.C.

(57) ABSTRACT

In sealing means for a slider unit in which sealing members of foam rubber are arranged to close sidewise clearances left open between a dustproof cover and side walls of a track rail, the improved sealing means is directed to making sure of effective sealing performance, prolonging a durable service life of the sealing member, and also making mounting of the sealing member to the clearances easier. Sealing members of flexible foam rubber rich in restoring force are arranged in the clearance between the dustproof cover and the side walls of the track rail. The sealing members, while fastened to the dustproof cover, are allowed to experience any deformation of expansion/collapse when sideward wings of the slider moves back and forward between the confronting sealing members and the side walls, with keeping close sliding engagement with the associated surfaces of the wings. Especially, the sealing member made in a configuration of substantially quadrilateral in traverse cross-section is preferable to help ensure high sealing performance because such sealing member is expansible and collapsible with keeping substantially the initial quadrilateral.

18 Claims, 12 Drawing Sheets

DUSTPROOF CONSTRUCTION FOR SLIDER UNIT

BACKGROUND OF THE INVENTION

1. Field of the Invention

The present invention relates to a dustproof construction for a slider unit, which is envisaged to close effectively any clearance between a track rail and a slider unit to thus prevent foreign materials such as dust and dirt, oil mist and so on from entering into the slider unit and also keep debris, metal cuttings, oil contamination and so on owing to the slider unit itself against escape outside the slider unit through there.

2. Description of the Prior Art

Referring first to FIGS. 18 and 19, there is shown an example of prior slider units conventionally used in various fields such as semiconductor manufacturing apparatus, machine tools, assembling apparatus, testing instruments and so on, which are needed to work in any clean room. The slider unit is primarily comprised of an elongated track rail 2 opened upwardly at 27 to provide an U-shaped traverse cross-section to make a recess 5, and a slider 2 fitting snugly in the recess 5 of the track rail 2 for sliding movement relatively to the track rail 2, a recirculating-ball screw shaft 4 mating with the slider 3, and a driving motor 4 to turn the recirculating-ball screw shaft 4. The recirculating-ball screw shaft 4 is supported for rotation on the track rail 2 at both of a first bearing member 11 installed in an lengthwise end near the driving motor 9 and a second bearing member 12 installed in the lengthwise opposite end of the track rail 2, which is fastened to any basement by means of suitable fastener means such as screws. The slider 3 is installed to move linearly along the track rail 2 through rolling elements. A bottom 6 and a pair of upright side walls 7 define in combination the upwardly opened recess 5 in the track rail 2. The side walls 7 are provided on their widthwise opposing inner surfaces with raceway grooves 8 that extend in parallel with each other lengthwise along the track rail while the sliding element 3 has raceway grooves confronting the raceway grooves 8 to define a load raceway between them. Rolling elements may run through the load raceway, thereby making the slider 3 move smoothly along the track rail 2.

The slider 3 has a pair of widthwise opposing upright flanges 13, which are to mount an object such as a workpiece table on the slider. The flanges 13 are made with threaded holes 14 for fixture means such as bolts to hold any object thereto. A dustproof cover 15 is attached to the bearing members 11, 12 so as to shield the track rail 2 with the exception of sidewise clearances 33 where the flanges 13 are allowed to move back and forth through there. Thus, the dustproof cover 15 is arranged above all of the slider 3 and the recirculating-ball screw shaft 4, which constitute in combination a torque-to-thrust conversion system for the slider unit, thereby keeping dust and debris against entering into and also coming prom inside the track rail 2. A pair of the upright flanges 13, on which the object to be moved is loaded, should be formed so as to be unobstructed with the dustproof cover 15. To this end, the upright flanges 13 each extend widthwise outwardly of the slider 3 and then turn upwardly to thereby provide a substantially L-shape in front view. The slider 3 has a nut 17 made therein with an internal helical groove that will mate with an external helical groove provided around the recirculating-ball screw shaft 4. The combination of the screw shaft 4 with the nut 17 constitutes a torque-to-thrust conversion system in which the rotation of the screw shaft 4 results in driving linearly the nut 17 along the track rail 2. The lengthwise opposite bearing members 11, 12 are mounted on railheads 20 of the upright side walls 7, 7 of the track rail 2. The railheads 20 are finished in parallel with the raceway grooves a of the track rail 2.

Sensor rails 22 are disposed on sidewise outsides of the upright side walls 7 of the track rail 2, each to side wall. The sensor rails 22 are each provided with a limit sensor 23 at any preselected place to sense the associated flange 13, followed by issuing the detected signal to a controller through a lead wire 24 and a sensor connector 25. The driving motor 9 is energized depending on any control signal applied through a motor connector 28 to produce a torque transmitted to the recirculating-ball screw shaft 4 via a coupling 30. A fore-and-aft range over which the slider 3 is allowed to travel is defined with stoppers 31, 32 that are secured to the bearing member 11, 12, each to each bearing member.

In Japanese Patent Laid-Open No. 325070/1999 there is disclosed a sealing construction for the slider unit constructed as stated earlier, in which bellows-like sealing means are installed to keep foreign matter such as dust, debris and so on against entering into and coming from inside the slider unit through the sidewise clearances 33. The bellows-like sealing means are each composed of at least one sealing member expansible owing to its own elasticity, which is secured to anyone of the confronting lengthwise edges of the track rail 2 and the dustproof cover 15 to close the associated clearance 33. When the slider 3 travels along the track rail 2, the flanges 13 extending across the clearances 33 are allowed to move smoothly because the sealing members are easily subject to the elastic expansile and collapsed deformation and thus thrust aside by the action of the moving flanges 13.

Another example of the sealing constructions for the slider unit made as stated earlier is disclosed in Japanese Patent Laid-Open No. 27235/2001, in which expansible sealing members are arranged in gaps between the track rail 2 and the dustproof cover 15 in a manner allowing the flanges 13 to travel through the gaps on the sliding movement of the slider 3 along the track rail. Each expansible sealing member is composed of upper and lower sealing parts that are urged elastically against each other to close the associated gap. When the flange travels across the associated gap, the upper and lower sealing parts are shoved apart from each other at only a region closely neighboring the moving flange to allow it to travel between the sealing parts, with keeping a sliding contact with the opposite surfaces of the moving flange. At the residual regions before and after the moving flange, however, the upper and lower sealing parts are kept in abutment against each other due to their own elasticity. Moreover, the upper and lower sealing parts are made in an elongated configuration that is attached at one lengthwise side thereof to any one edge of the gap and abutted against the counterpart with their own elasticity. The lower sealing part is made greater in elastic force than the upper sealing part to compensate the influence of gravity.

With most prior slide units, any elongated slits or clearances 33 are left uncovered between the dustproof cover 15 and the track rail 2 to allow the flanges 13 for supporting thereon a workpiece table to travel back and forward integrally with the slider 3 along the clearances 33, with extending sidewise across the clearances 33. This means many conventional slider units should not be able to effectively prevent foreign materials such as dust and dirt, and so on from entering into the slider unit through the clearances 33 and also keep debris, metal cuttings, and so on owing to the slider unit itself against scattering all around through the clearances 33 in the clean room where the semiconductor manufacturing machines are installed. To cope with this, various ways constructed as stated earlier have been proposed to keep dust and debris against entering into and escape out of the dustproof cover through slits, clearances 33 and so on. Nevertheless, the major obstacles to all the sealing constructions in which the bellows-like expansible sealing members are installed to close the sidewise clearances 33 and in which the upper and lower expansible sealing parts are urged elastically against each other to close the clearances 33 are necessitating the sophisticated expansible sealing members that are very tough to form them and thus become high in their production cost. Moreover, another problem faced in the expansible sealing members as stated above is making sure of elasticity, with even superior sealing property.

SUMMARY OF THE INVENTION

The present invention, therefore, has as its primary object to overcome the problems as stated just above and to provide sealing means for a slider unit, which is provided with a sealing member simple in construction and also inexpensive in production cost. The major object of the present invention is to provide sealing means for a slider unit, in which sidewise wings of the slider are allowed to travel back and forward across sidewise clearances left open between a track rail and a dustproof cover at widthwise opposite sides of the slider unit, and especially to provide the improved sealing means wherein expansible cellular members are installed to close the sidewise clearances, but collapse to allow the sidewise wings to move across the clearances, thereby preventing foreign materials such as dust and dirt, oil mist and so on from entering into the slider unit and also keeping debris, metal cuttings, oil contamination and so on owing to the slider unit itself against escape outside the slider unit through there into a clean room where the semiconductor manufacturing machines are installed.

The present invention is concerned with a sealing means for a slider unit, comprising a track rail having a pair of lengthwise side walls opposing to each other widthwise of the tack rail, a slider movable on the track rail, and a cover arranged over the track rail in a manner spanning between the side walls, wherein sidewise clearances are left open between the cover and the side walls of the track rail, each to each side wall, in a manner extending lengthwise of the track rail, the slider is made integrally with wings extending sideward from sides of the slider, each to each side, across the clearances and terminating in flanges turned upward, and sealing members of flexible, porous substance are arranged in the clearances between the side walls of the track rail and the cover to close the clearances, each to each clearance, in such a way that the sealing members are each fastened to any one of the associated side wall and the cover and allowed to experience any deformation of expansion/collapse, with keeping sliding engagement with the associated wing that pushes its way out the sealing member when the slider travels along the track rail In one aspect of the present invention there is disclosed a sealing means for a slider unit, in which the sealing member is formed conforming to a contour of the clearance. For instance, the sealing member is made in a configuration of substantially quadrilateral in traverse cross-section, which may experience any deformation of expansion/collapse at place where the wind of the slider travels there, with keeping substantially the initial quadrilateral. As an alternative, the sealing member is made in a traverse cross-section in which an area near a lengthwise surface to be fastened to any one of the side wall and the cover is made widthwise thick while a remaining area is reduced gradually in widthwise thickness towards an opposite surface, which will come into sliding engagement with the associated wing of the slider. With the modified sealing member stated just above, the deformation of expansion/collapse caused in the sealing member when the associated wing of the slider travels will occur substantially in only the area slim in width and further the deformation is kept against bulging out sideward beyond the width of the thick area. Thus, the modified sealing member is able to continue ensuring substantially its initial configuration in cross section even under any deformation of expansion/collapse and, therefore, will never interfere with any motion of other parts owing to the deformation of expansion/collapse.

In another aspect of the present invention, there is disclosed a sealing means for a slider unit, in which the sealing member has a spring element to intensify a restoring force of the sealing member after subjected to any deformation of expansion/collapse occurring due to travelling of the wing of the slider. The spring element is arranged in a way extending lengthwise along any side of the sealing member, which will come into sliding contact with the wing of the slider.

In another aspect of the present invention, there is disclosed a sealing means for a slider unit, in which the sealing member is made of foal rubber. Moreover the foam rubber to provide the sealing member is coated with a protective skin.

In another aspect of the present invention there is disclosed a sealing means for a slider unit, in which the sealing member has a fastener plate on a surface thereof to be secured to any one of the side wall and the cover.

In another aspect of the present invention there is disclosed a sealing means for a slider unit, in which the sealing member has a wear proof slideway belt lengthwise on a surface thereof coming into sliding engagement with the associated wing of the slider. Moreover, the wing of the slider also has a wear proof slideway belt on a surface thereof coming into sealing member.

In another aspect of the present invention there is disclosed a sealing means for a slider unit, in which the cover encloses a top surface of the sealing member to shield the sealing member. Moreover, the cover is comprised of a roof to shield the top surfaces of the sealing members, and widthwise opposing side panels hanging from the lengthwise edges of the roof into gaps between the sidewise outsides of the sealing members and the flanges of the slider.

In another aspect of the present invention there is disclosed a sealing means for a slider unit, in which the track rail includes a bottom integral with the side walls to be made in a trough opened upward.

In a further another aspect of the present invention there is disclosed a sealing means for a slider unit, in which the slider is allowed to move back and forward with smoothness by virtue of rolling elements that run through load raceways defined between raceway grooves on widthwise opposite sides of the slider and raceway grooves on the sidewise opposing inside surfaces of the side walls.

In another aspect of the present invention there is disclosed a sealing means for a slider unit, in which the sealing member is comprised of upper and lower sealing halves laid one on top of another, the upper half being fastened to the cover while the lower half being secured on the side wall, and the wing of the slider is arranged to move back and forward between the upper and lower sealing halves.

In a further another aspect of the present invention there is disclosed a sealing means for a slider unit, in which the track rail is composed of a guideway member made with raceway grooves confronting raceway grooves on the slider to define load raceways between them to allow rolling elements to run through there, and a base frame has the side walls to hold the guideway member.

In another aspect of the present invention there is disclosed a sealing means for a slider unit, in which a pair of the guideway members are spaced sidewise apart from one another and secured lengthwise to the base frame, while the slider is arranged to fit over the guideway members.

In another aspect of the present invention there is disclosed a sealing means for a slider unit, in which the slider is comprised of a sliding part made with raceway grooves that cooperate with raceway grooves on the guideway member to define load raceways between them where rolling elements are allowed to run through there, and a carriage mounted on the sliding part and including the wings extending sideward and terminating in upward flanges.

With the sealing means constructed as stated earlier, the sealing members of foam rubber may effectively closed the sidewise clearances left open between the dustproof cover and the side walls of the track rail. Nevertheless, the sideward wings of the slider are allowed to travel back and forward with smoothness between the sealing members and either the side walls or the dustproof cover, with making sure of sealing effect on the clearances between the sealing members and either the side walls or the dustproof cover. The sealing member, as designed in a configuration conforming to the contour of the clearance, may be easily subjected to any deformation without substantial effort to push the sealing member aside when the associated wing of the slider travels across the clearance with thrusting its way out the sealing member. This is favorable for making sure of good sealing performance. According to the sealing construction of the present invention, there is no possibility that foreign materials such as dust and dirt, and so on either enter into or come from inside the slider unit through the clearances left open between the dustproof cover and the side walls of the track rail. Especially, debris, metal cuttings, and so on owing to the slider unit itself are kept against scattering all around through the clearances in the clean room, which will be thus maintained in any desired cleanliness. As the foam rubber for the sealing member is made in a simple quadrangular shape in traverse cross-section, rather than any sophisticated shape and structure that might introduce costly production requirements, the sealing member devised in the present invention can be much reduced in its production cost and also is easy to apply it to any clearance left open between the dustproof cover and the side wall.

The sealing member made in the quadrangular shape in cross section is allowed to simply collapse and/or expand with no need of substantial effort to push the sealing member aside at any place where the associated wing of the slider travels across the clearance, thus making sure of good sealing performance. Moreover, in the modified sealing member in which an area near a lengthwise surface to be fastened to any other member is made widthwise thick while a remaining area is made slim in widthwise thickness towards an opposite surface making any sliding engagement with the associated wing of the slider, only the slim area is allowed to expand and/or collapse with much smoothness when the wing of the slider pushes its way out the sealing member. In addition, as the slim area is certainly kept against bulging out sideward beyond the widthwise thickness of the thick area, the sealing member may be expansible and collapsible with keeping substantially its initial quadrilateral.

The spring element installed in the sealing member lengthwise along the side making any sliding contact with the wing of the slider is to intensify the sealing member in force to restore its initial shape after subjected to the deformation of expansion/collapse. Even if the foam rubber of the sealing member 1a were subjected to deterioration due to aging, for instance, even when the wing of the slider were actuated after stood idle for a long period moreover, any resilient force of the spring element would aid the sealing member to immediately restore its initial shape from the deformation of expansion/collapse, without leaving signs of the associated wing on the sealing member. Thus, it will be expected that the resilient force of the spring element works by improving the response of the sealing member to the expansion/collapse, thereby raising the close engagement of the sealing member to other surfaces to make sure of high sealing performance.

With the sealing means constructed as stated earlier, since the sealing member itself is made in a very simple configuration in traverse cross-section, for example made in either a quadrilateral or a trapezoid composed of thick and slim areas, and also formed conforming to the contour of the clearance, the sealing member may be fit simply in the clearance left open between the dustproof cover and the side wall of the track rail and less subject to any irregular deformation, thus realizing improvement in sealing performance, with even inexpensive in production cost. With the sealing means stated above, debris, metal cuttings, oil mist and so on owing to the slider unit itself are kept against scattering outside the slider unit in, especially, the clean room where the semiconductor manufacturing machines are installed, and moreover the occurrence of the debris owing to wear is made most reduced ever realized. Consequently the sealing means for slider units according to the present invention serves good sealing function and there is no occurrence of any obstacle in the clean room, which might be because the slider unit itself. Further, the sealing construction using the sealing member of porous substance such as foam rubber is effective to protect the slider unit against an invasion of foreign matter such as dust and dirt through the clearances in the slider unit.

The above and other related objects and features of the present invention will be more apparent to those skilled in the art from a reading of the following description of the disclosure found in the accompanying drawings and the novelty thereof pointed out in the appended claims.

DETAILED DESCRIPTION OF THE PREFERRED EMBODIMENTS

Figure 18:
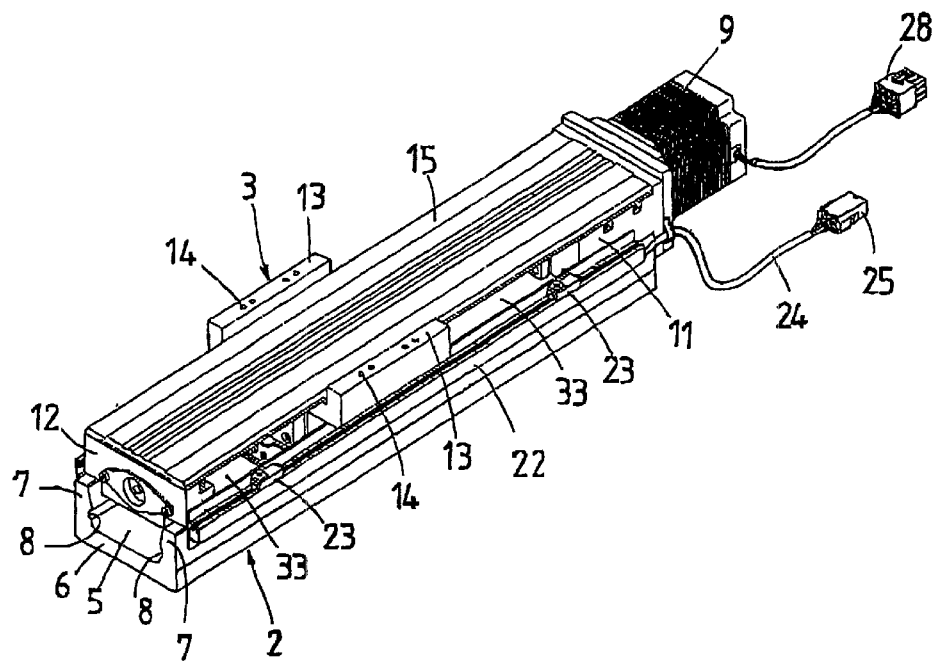
FIG. 18 is a perspective view illustrating a conventional slider unit.
Figure 19:
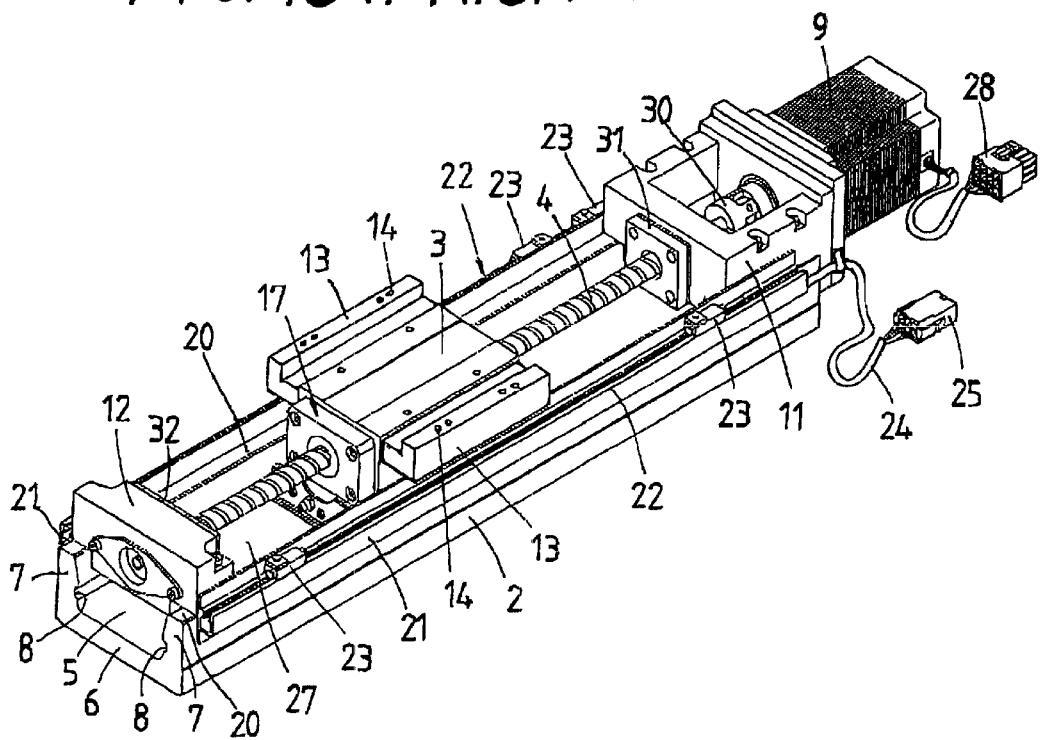
FIG. 19 is a perspective view of the conventional slider unit in FIG. 18, but in which a dustproof cover is shown as being removed.

Referring now in detail to the accompanying drawings, a slider unit having a sealing means according to the present invention will be explained below. The slider unit incorporated with the sealing means of the present invention will be used in various fields such as semiconductor manufacturing apparatus, machine tools, assembling apparatus, testing instruments and so on, which are needed to work in any clean room. The slider unit referred to FIGS. 1 to 17 is substantially the same as the prior slider unit previously stated in reference to FIGS. 18 and 19. To that extent, the same reference character identifies equivalent or same components and parts in the slider unit shown in FIGS. 18 and 19, so that the previous description will be applicable.

Referring first to FIGS. 1 to 5, there is illustrated a preferred embodiment of a sealing means for a slider unit according to the present invention. The slider unit having incorporated with the sealing means of the first embodiment is mainly comprised of a track rail 2 having widthwise opposing side walls 7, a slider 2 accommodated in the track rail 2 for sliding movement, and a dustproof cover 15 arranged above the track rail 2 to extend astride between the side walls 7 of the track rail 2, thereby closing substantially a lengthwise recess 27 opened upwardly. Lengthwise clearances 33 are left open between the dustproof cover 15 and the side walls 7 of the track rail 2, while the slider 3 is provided integrally at widthwise opposite sides thereof with lateral wings 10 extending sidewise across the clearances 33. The lateral wings 10 bend upward at the extremities thereof to provide flanges 13. Sealing members 1 are installed in the clearances 33 between the dustproof cover 15 and the side walls 7 of the track rail 2 to close the clearances 33. The track rail 2 is fastened to any basement such as a machine bed by tightening bolts.

The slider 3 has a nut 17 made therein with an internal helical groove that will mate with an external helical groove provided around the recirculating-ball screw shaft 4, which fits for rotation in bearing members 11, 12 mounted in the track rail 2. On any one of fore-and-aft ends of the track rail 2 there is attached a bracket 36 to which is mounted a driving motor 9. Thus, rotating the recirculating-ball screw shaft 4, either clockwise or counterclockwise, by means of the driving motor 9 causes the slider 3 to move back and forward along the track rail 2. On another end of the track rail 2 there is secured an end cover 35 by fastening screws 39, which is made with an intake port 47 threaded internally at 39. Besides, the slider 3 has mounted with end seals 46 and grease nipples 43, while a suction tube 41 is connected to the intake port 47 to expel debris, metal cuttings, oil mist and so on, which might be accumulated in the recess 5 in the track rail 2, outside any enclosure such as a clean room.

Figure 2:
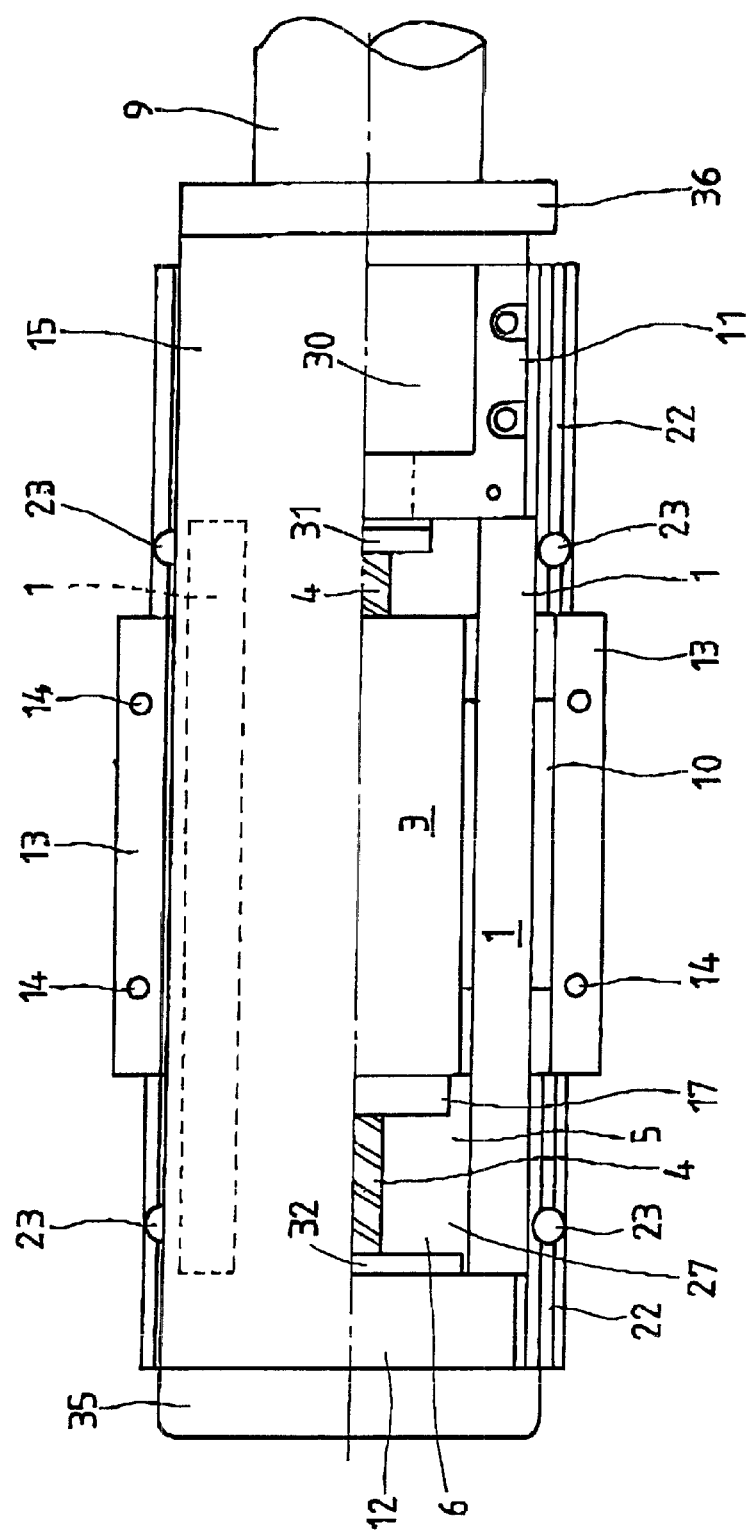
FIG. 2 is a top plan view of the slider unit shown in FIG. 1, but in which a dustproof cover is removed partially to look into the interior construction of the slider unit.
Figure 3:
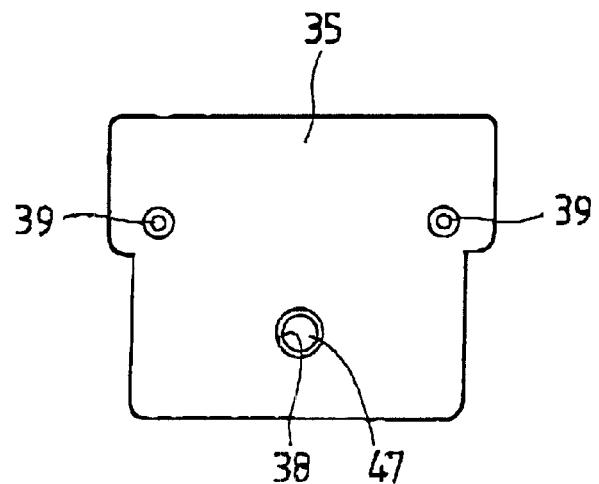
FIG. 3 is a left-hand end elevation of the slider unit in FIG. 1.

The side walls 7 of the track rail 2 are integral with a bottom 6 of the track rail 2 to provide the track rail 2 that is made in the configuration of a trough left open upwards at 27. With the present slider unit, the recess 5 defined in the track rail 2, as shown in FIG. 2, is plugged at one end of the forward and aft ends thereof with the bearing member 12 and the end cover 35, while at another end with the end cover 35 and the bearing member 11 near the driving motor 9. As seen from FIG. 4, the elongated track rail 2 provides the recess 5 of an U-shape configuration in traverse cross-section thereof, in which the slider 3 is accommodated for linear movement to any desired position along raceways made on sidewise opposing inside surfaces of the side walls 7. The slider 3 may move back and forward with smoothness by virtue of rolling elements that are allowed to run through load raceways defined between raceway grooves 45 on widthwise opposite sides of the slider 3 and raceway grooves 8 on the sidewise opposing inside surfaces of the side walls 7. Sensor rails 22 are disposed on railheads of the side walls 7 of the track rail 2 each to side wall. On each sensor rails 22 there are installed two limit sensors 23 at any preselected places as shown in FIG. 2.

Figure 4:
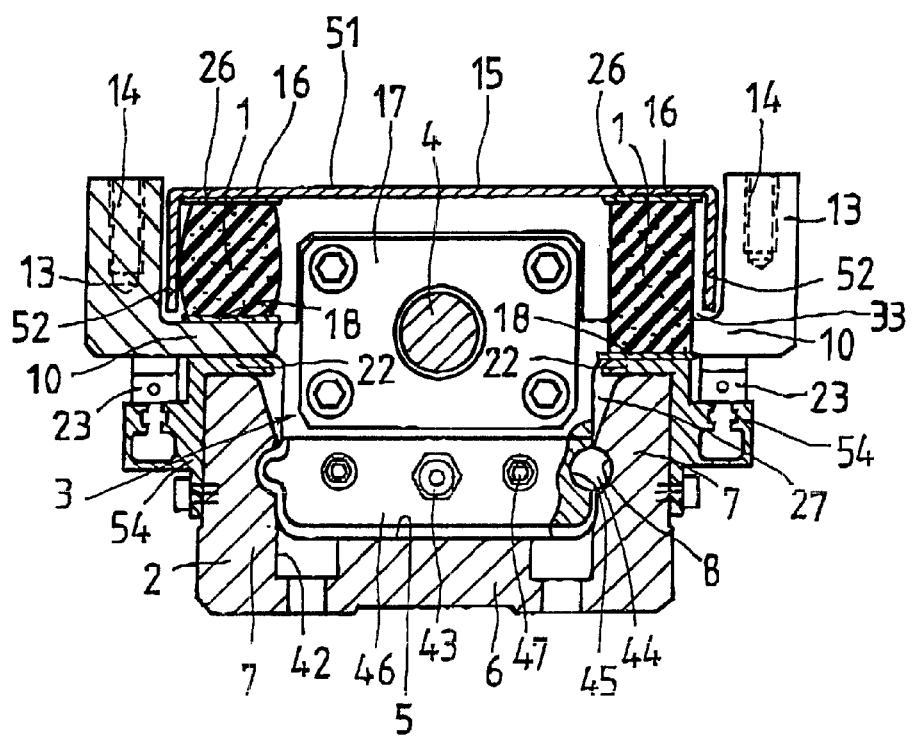
FIG. 4 is a traverse cross-section taken along the line I—I in FIG. 1, but in which the left- and right hand sides are shown as being taken on different planes from each other with respect to the fore-and-aft direction of the slider unit.

As illustrated in FIG. 4, the sealing member 1 is attached to the dustproof cover 15 through a fastener plate 16 that is secured to the sealing member 1. Each sealing member 1 is made to be easily subject to expansible/collapsible deformation to keep sliding contact with any confronting surface of the associated lateral wing 10 of the moving slider 3. Thus, the lateral wings 10 of the slider 3 are allowed to move between the sealing members 1 and the railheads of the side walls 7, which are always urged to come into abutment against each other, with keeping sliding contact on upper sides thereof with slideway belts 18 attached to the bottoms of the sealing members 1 while on lower sides thereof with the sensor rails 22 integral with brackets 54 secured on the railheads 20 of the side walls 7 of the track rail 2 to support the limit sensors 23. Between the dustproof cover 15 and the railheads 20 of the side walls 7 of the U-shaped track rail 2 there are left open lengthwise clearances 33, through which the lateral wings 10 extend sidewise outside the slider 3, so that the wings 10 may travel fore-and aft in the clearances 33. The sealing member 1 is made of foam rubber while the lateral wings 10 always coming into sliding contact with the sealing member 1 is slanted at 40 to form forward and aft tapered ends, by virtue of which the foam rubber-made sealing member 1 may be controlled to smoothly move up and down.

Figure 5:
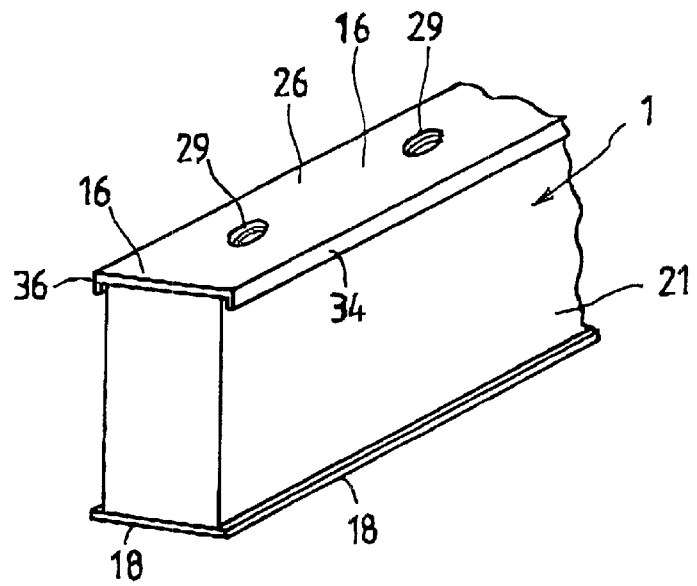
FIG. 5 is a fragmentary perspective view showing an embodiment of a sealing member to be incorporated in the slider unit.

The sealing member 1 according to the present invention is made of highly flexible, cellular material exhibiting a satisfactory restoring force because of its own elasticity. Moreover, the sealing member 1 is made in a construction that is easy for production and handling thereof, making sure of long-lasting service life even under repeated expansion/collapse, and also excellent in sealing performance, compared with any prior sealing member. It is to be noted that the sealing member 1 of the present invention can be formed conforming to the contour of the clearance 33. The sealing member 1, as illustrated in FIG. 5, is made in a configuration of substantially quadrilateral such as rectangle, square and so on in traverse cross-section. The sealing member 1 is also made of any material that may be expansible and collapsible with keeping substantially the initial quadrilateral when the lateral wing 10 of the slider 3 pushes its way out the sealing member 1. It is, for example, preferred that the sealing member 1 is made of any foam rubber of cellular structure containing small closed cells, which makes sure of the sealing performance to certainly prevent the dust, debris and so on from entering into and coming from inside the slider 3. In some cases, the sealing member 1 may be coated with any protective skin 21.

The foam rubber is a flexible, porous latex sponge having a restoring force because of its own elasticity, which is made from any natural or synthetic latex compounded with various ingredients such as sulfur, vulcanization accelerator, antioxidant, blowing agent and so on, and whipped into a froth. The resulting product is molded with any coagulating agent and vulcanized with heating steam or hot water, followed by rinsing and drying. Although but the sealing member may be coated with any moisture-proof skin 21, it will be preferable to leave the overall surface thereof uncovered or bare because there is no possibility of any cracking, which might happen in the skin 21 owing to the repeated expansion/collapse. The sealing performance of the sealing members 1 installed in the sidewise clearances 33 was examined in the slider unit in which the stroke of the slider 3 was 270 mm, the acceleration/deceleration in sliding movement was 0.1 sec., the sliding speed of the slider 3 was 1000 mm/s, the volume of sucked air was 30 liter/min., the lead of helical groove around the recirculating-ball screw shaft 4 was 20 mm and a clean grease was employed. The test result exhibited the cleanliness level of at most class 3.

On a lengthwise top surface of the foam rubber-made sealing member 1, as shown in FIG. 5, the elongated fastener plate 16 is attached through either any pressure sensitive adhesive double coated tape or any adhesive to help mount detachably the sealing member 1 to the dustproof cover 15. On a lengthwise bottom of the sealing member 1, the slideway belt 18 is attached through either any pressure sensitive adhesive double coated tape or any adhesive. The slideway 18, as coming into sliding engagement with the upper surface of the lateral wing 10 of the slider 3, is preferably made of any substance less in raising dust and dirt. The fastener plate 16 is made of a stainless steel plate bent downward at widthwise opposing, lengthwise edges 34 thereof to form an inverted U-shape in traverse cross-section, which is somewhat larger in width than the foam rubber-made sealing member 1 so as to fit loosely over the sealing member 1. Besides, the fastener plate 16 is made with bolt holes 9 to fasten the sealing member 1 to the dustproof cover 15, which are positioned at lengthwise regular intervals. The fastener plate 16 bent downward at the lengthwise edges 34 thereof to form the inverted U-shaped configuration makes sure of sufficient stiffness, with even light in weight.

For the slideway belt 18 fastened lengthwise to the bottom of the foam rubber-made sealing member 1, a wafer conveying belt used commonly in the clean rooms is available, which is made of any polyester hard to give rise to cuttings owing to wear. Accordingly, the slideway belt 18 is made of any polyester of polyester resins, polyester fibers and so on at least at a limited surface thereof coming into sliding engagement with the associated lateral wing 10 of the slider 3. The slideway belt, although not shown, may be also attached to the lateral wings 10 of the slider 3 at the limited area coming into sliding engagement with the sealing member 1 to much reduce the incidence of debris. Moreover, the slideway belt 18 is made somewhat greater in width than the foam rubber of the sealing member 1 to such an extent that the foam rubber of the sealing member 1, irrespective of its expansion/collapse, can't bulge out sideward beyond the slideway belt 18, thus never coming into sliding engagement with the confronting surface of the associated lateral wing 10 of the slider 3. On the surface of the lateral wing 10 of the slider 3 coming into sliding engagement with the slideway belt 18, although not illustrated, there is preferably attached another wear proof slideway belt to improve wear resistance, thereby much reducing the occurrence of debris because of wear.

In the clearance 33 left between the associated side wall 7 of the track rail 2 and the dustproof cover 15, as illustrated in FIG. 4, there is extended the lengthwise sensor rail 22, which is arranged on the outside surface of the track rail 2, to lie along the railhead 20 of the side wall 7 of the track rail 2, thus providing a guide surface to support steady thereon the bottom of the foam rubber-made sealing member 1. As an alternative, the construction in which the railhead 20 of the side wall 7 of the track rail 2 is rendered greater in width would make it possible to discard the sensor rail 22 extending over the railhead 20 of the side wall 7.

With the sealing construction for the slider unit constructed as stated earlier, the intake port 47 is bored through the end cover 35 and the bearing member 11 near the driving motor. The intake port 47 is to expel the air containing debris, metal cuttings, oil mist and so on, which might occur in the recess 5 in the track rail 2 because of reciprocating movement of the slider 3, outside any enclosure such as a clean room.

The dustproof cover 15 shields the sealing member 1. To this end, the dustproof cover 15, as illustrated in FIG. 4, is comprised of a roof 51 to cover the top surfaces of the sealing members 1, and widthwise opposing side panels 52 hanging from the lengthwise edges of the roof 51 into gaps between the sidewise outsides of the sealing members 1 and the flanges 13 of the slider 3.

Figure 6:
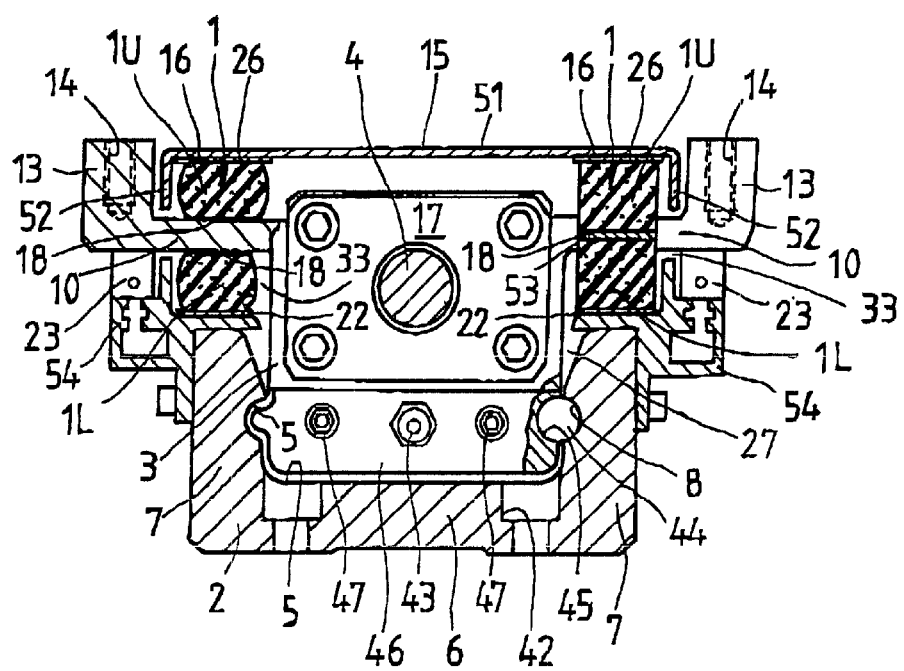
FIG. 6 is a traverse cross-section similar to FIG. 1 to show a second embodiment of a sealing means according to the present invention, with taken on a plane corresponding to the line I—I in FIG. 1.

Referring next to FIG. 6, there is shown a second embodiment of the sealing construction for the slider unit according to the present invention. In this second embodiment, the sealing member 1 is comprised of two sealing halves 1U and 1L laid one on top of another: one half 1U fastened to the dustproof cover 15 and another half 1L secured on the top surface of the sensor rail 22 mounted on the side wall 7 of the track rail 2. Each lateral wing 10 of the slider 3 is arranged to move back and forward between the upper and lower sealing halves 1U, 1L. The sealing halves 1U and 1L are urged to come into abutment against each other at their confronting surfaces 53 so that the lateral wing 10 of the slider 3 is allowed to travel between the sealing halves 1U, 1L with keeping the sliding engagement with the confronting surfaces 53. Thus, the wear-proof slideway belts 18 may be attached to the confronting surfaces 53, each to each surface. With the second embodiment of the sealing construction as stated just above, the amount of collapse occurring in the sealing member 1 because of the moving wing 10 will be shared equally out to two sealing halves 1U and 1L, so that the amount of expansion/collapse per foam rubber unit will be reduced, compared with the sealing construction in the first embodiment stated earlier. It will be thus expected that the less the amount of expansion/collapse occurring in the foam rubber, the longer the durable service life of the foam rubber. It will be further expected that the resistance that is encountered when the lateral wing 10 pushes its way out the foam rubber is made somewhat reduced.

A third embodiment of the sealing means for the slider unit according to the present invention will be explained later with reference to FIG. 7. In the third embodiment, the foam rubber-made sealing member 1 to close the associated clearance 33 is secured at the bottom thereof onto the sensor rail 22 applied on the side wall 7 of the track rail 2. On the top surface of the sealing member 1 there is attached the slideway 18 that will come into sliding engagement with the lower surface of the moving lateral wing 10 when the slider 3 travels along the clearance 33. According to the third embodiment, moreover, side panels 19 to shield the widthwise opposing sides of the foam rubber-made sealing member 1 extend upward rather than hanging downward. The fastener plate 16 is preferably fixed to the bottom of the sealing member 1.

Figure 8:
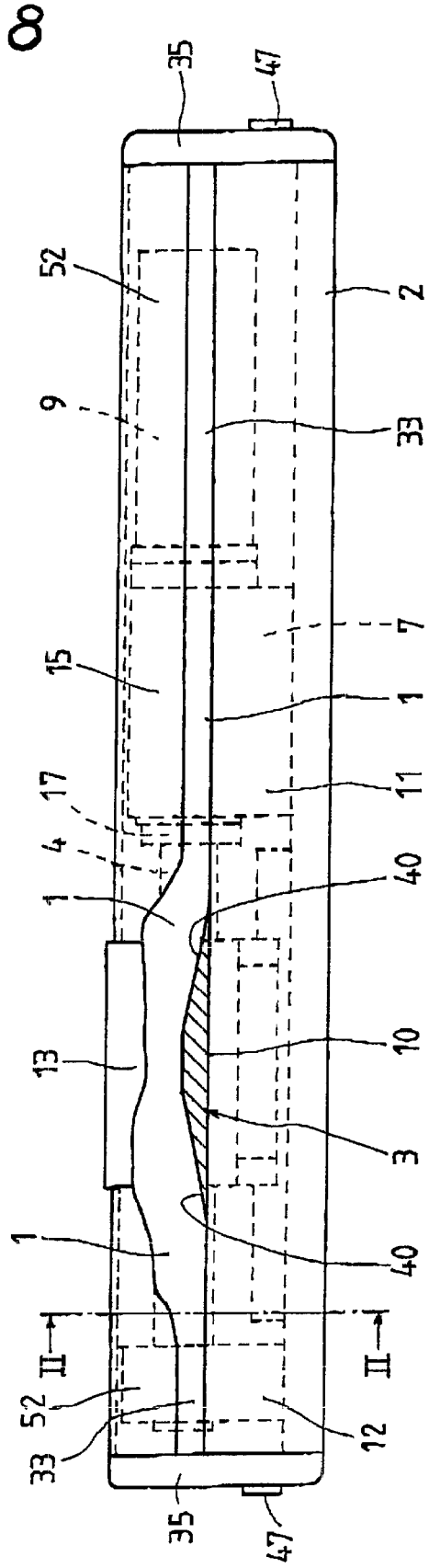
FIG. 8 is a front elevation view, partly broken away, showing a fourth embodiment of a sealing means for a slider unit according to the present invention.
Figure 9:
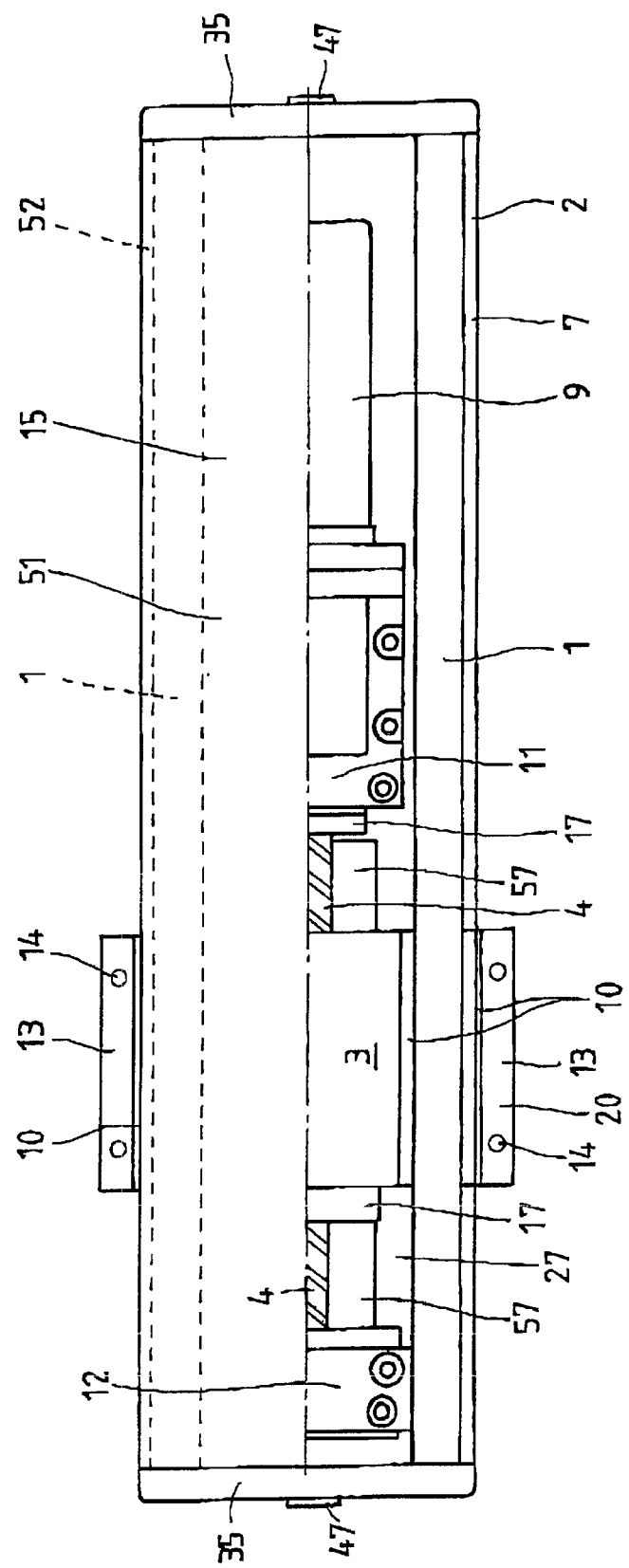
FIG. 9 is a top plan view of the slider unit shown in FIG. 8, but in which a dustproof cover is removed partially to look into the interior construction of the slider unit.
Figure 10:
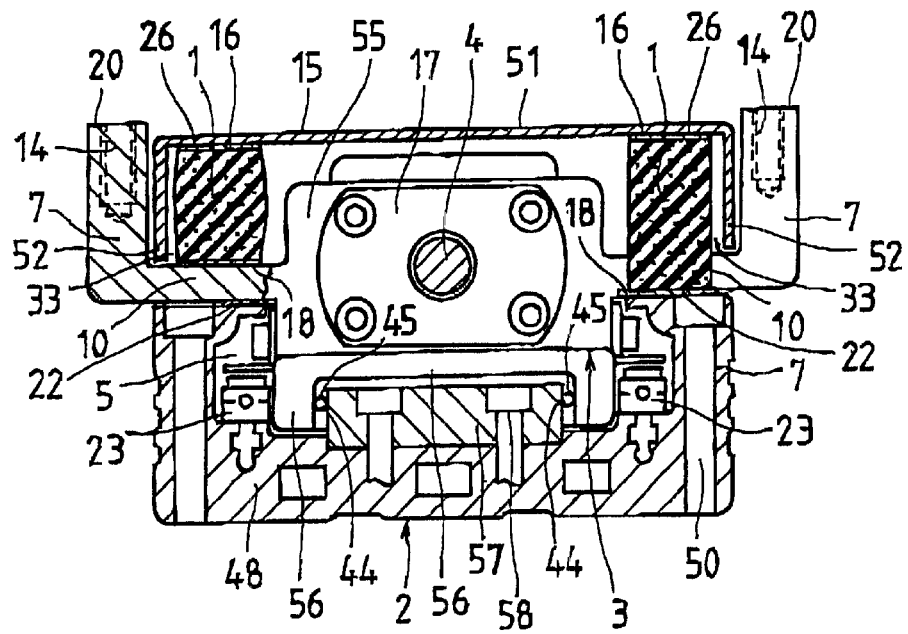
FIG. 10 is a traverse cross-section taken along the line II—II in FIG. 8, but in which the left- and right hand sides are shown as being taken on different planes from each other with respect to the fore-and-aft direction of the slider unit.

Further referring to FIGS. 8 to 10, there is shown a fourth embodiment of the sealing means for the slider unit according to the present invention. In this fourth embodiment, the sealing members 1 are installed to close the clearances 33, each to each clearance, while the slider unit has a base frame 48 made therein with the recess 5 of U-shape in traverse cross-section, which is fastened to any basement by means of bolts 50. The track rail 2 is composed of a guideway member 57 made with raceway grooves 8 confronting raceway grooves 45 on the slider 3 to define load raceways between them to allow rolling elements 44 to run through there, and the base frame 48 having widthwise opposing side walls 7 to define the recess 5 between them to accommodate therein the guideway member 57, which is then fastened to the base frame 48 by means of fastener bolts 58.

The slider 3 is comprised of a movable part 56 fitting over and conforming to the guideway member 57 for sliding movement along the track rail 2, and a carriage 55 mounted on the movable part 56. The movable part 56 is made with a raceway groove 45 that cooperates with a raceway groove 8 on the guideway member 57 to define a load raceway between them where rolling elements 44 are allowed to run through there. The carriage 55 includes therein a recirculating-ball screw and nut system 17 and lateral wings 10 extending sideward and terminating in upward flanges 13 on which are attached various types of objects. The slider 3 for the slider unit is arranged for linear movement to any desired position along the base frame 48 of the track rail 2.

With the slider unit constructed as stated just above, the base frame 48 is plugged at forward and aft ends thereof with end covers 35, each to each end, so that the recess 5 inside the base frame 48 is closed. The motor 9 to drive the recirculating-ball screw shaft 4 is accommodated in the recess 5 inside the base frame 48. The end covers 35 are provided with the intake ports 47 to which are connected suction tubes, each to each port. The dustproof cover 15 has widthwise opposing side panels 52 hanging down into gaps between the sealing members 1 and the flanges 13 of the slider 3. The sealing member 1 is fastened at a top surface 26 thereof to the reverse of the roof 51 of the dustproof cover 15 through the fastener plate 16 disposed between them. As the slider 3 moves lengthwise, the lateral wing 10 travels between the slideway belt 18 on the bottom of the sealing member 1 and the top surface of the side wall 7 of the base frame 48, with keeping the sliding engagement at the upper surface thereof with the slideway plate 18 while at the lower surface thereof with the sensor rail 22. Since the sidewise clearance 33 left between the associated side panel 52 of the dustproof cover 15 and the top surface of the side wall 7 of the base frame 48 extends the substantially overall length of the track rail 2, the sealing member 1 is installed over the overall length of the clearance 33 to close entirely the clearance 33.

Figure 11:
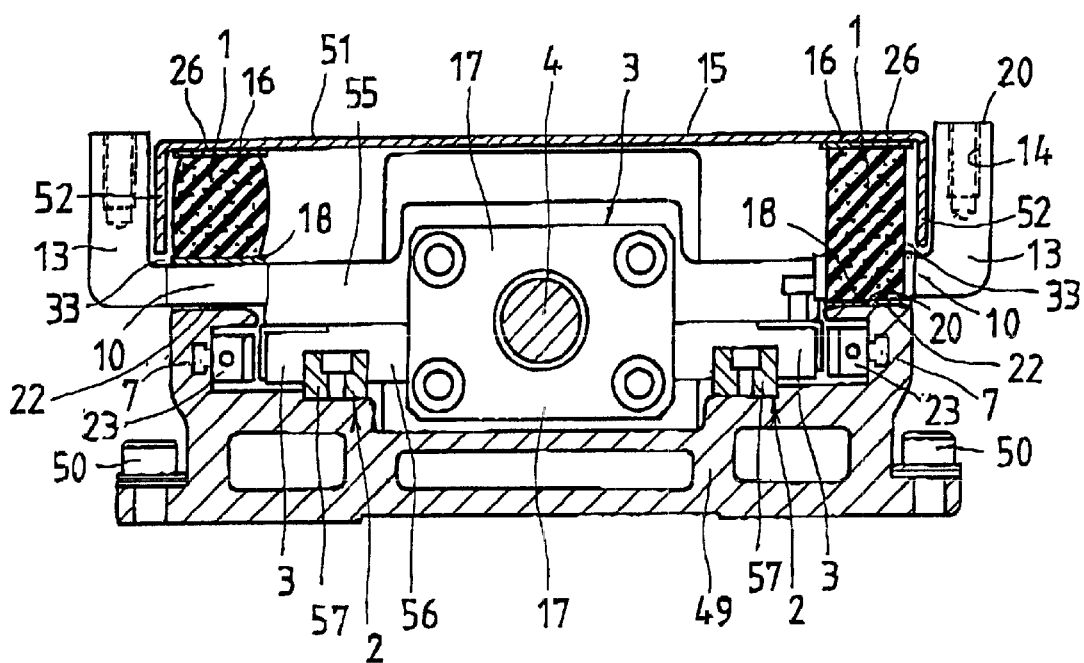
FIG. 11 is a traverse cross-section showing a fifth embodiment of a sealing means according to the present invention, with taken on a plane corresponding to the line II—II in FIG. 8.

Referring next to FIG. 11, there is shown a fifth embodiment of the sealing construction for the slider unit according to the present invention. The fifth embodiment has widthwise opposing linear motion guide units, each of which is composed of a slider 3 and a track rail 2 common to both the linear motion guide units. The track rail 2 is composed of a base frame 49 fastened to any basement by means of fastening bolts, and guideway members 57 spaced sidewise apart from one another and secured lengthwise to the base frame 49. The slider 3 includes moving parts 56 sidewise spaced apart from each other, and a carriage 55 mounted on the moving parts 56 in a manner riding astride the moving parts 55. The moving parts 56 of the slider 3 are each arranged to fit over and conforming to the associated guideway member 57. The base frame 49 is made in an integral construction of U-shaped configuration. As an alternative, the base frame 49 may be made of halves with side walls 7 rather than a unitary construction, which are prepared separately from each other, and then assembled into an integral construction.

According to the fifth embodiment, the sealing member 1 of elongated foam rubber has at its top surface the fastener plate 16 where the sealing member 1 is attached to the roof 51 of the dustproof cover 15. The sealing member 1 is also affixed on the bottom thereof with the slideway belt 18, which is urged elastically against the top surface of the associated side wall 7 of the base frame 49 to come into close abutment against the top surface, with keeping a preselected interference. Moreover, since the slider 3 rarely runs from end to end over the overall length of its tolerable stroke, the sealing member 1 has only to be contact at its lengthwise opposing ends with the top surface 20 of the associated side wall 7 of the base frame 49. This is advantageous for keeping the foam rubber against turned up or distorted at the ends thereof, thus making sure of long-lasting sealing performance. With the sealing construction as stated earlier, the lateral wings 10 extending sideward from the carriage 55 of the slider 3 are each allowed to travel between the slideway belt 18 on the bottom of the sealing member 1 and the top surface 20 of the side wall 7 of the base frame 48, with keeping the sliding engagement at the upper surface thereof with the slideway plate 18 while at the lower surface thereof with the sensor rail 22. It will be noted that the lateral wing 10 coming into sliding contact with the sealing member 1 of foam rubber is also slanted at 40 to form forward and aft tapered ends, by virtue of which the foam rubber-made sealing member 1 may be controlled to smoothly move up and down.

Sixth to tenth embodiments of the sealing construction according to the present invention will be explained hereinafter with reference to FIG. 12 and FIGS. 14 to 17.

Figure 13:
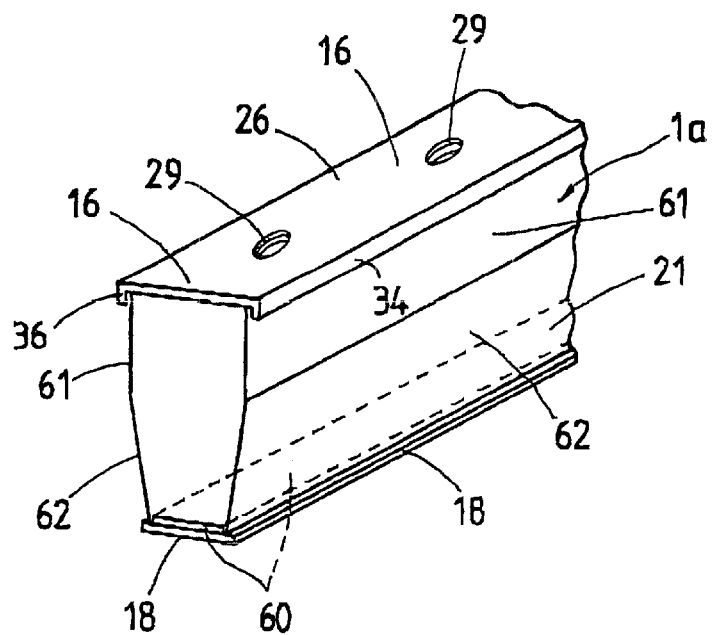
FIG. 13 is a fragmentary perspective view of another embodiment of a sealing member, which is incorporated with a spring element.

The sixth to tenth embodiments differ in only the configuration of the sealing member 1 from the first to fifth embodiments illustrated in FIGS. 4 to 7, 10 and 11. In detail, the first to fifth embodiments stated earlier have incorporated with the sealing member 1 exemplified in FIG. 5, whereas a modified sealing member is employed in the sixth to tenth embodiments stated later. The modified sealing member shown in FIG. 13 is similar in structure to the sealing member 1 in FIG. 4 with the exception of a spring element 60 installed therein, and thus given the same reference numeral affixed with "a": 1a. Most of other parts and components in the embodiments stated later are the same previously described in the embodiments stated earlier. To that extent, the parts and components will be given the same reference characters, so that the previous explanation will be applicable.

Embodiments in FIGS. 12 and 14 to 17 have incorporated with the sealing members 1a shown in FIG. 13. The sealing member 1a is made in a modified configuration in traverse cross-section, in which an area 61 near a lengthwise surface to be fastened to either the side wall 7 or the dustproof cover 5 is made widthwise thick compared with the remainder 62 that is reduced gradually in widthwise thickness towards the opposite surface, which will come into sliding engagement with the associated lateral wings 10 of the slider 3. In the slim area 62 of the sealing member 1a, sidewise opposing surfaces are made tapered off to form any substantially trapezoidal configuration in traverse cross-section. With the sealing member 1a constructed as stated just above, the slim area 62 is allowed to expand and/or collapse with much smoothness when the lateral wing 10 of the slider 3 pushes its way out the sealing member 1a. In addition, as the slim area 62 is kept against bulging out sideward beyond the widthwise thickness of the thick area 61, the sealing member 1a may be expansible and collapsible with keeping substantially its initial quadrilateral.

The sealing member 1a incorporated in the embodiments shown in FIGS. 12 and 14 to 17 has the spring element 60 made of a leaf spring and so on, which extends lengthwise along the side brought into sliding contact with the lateral wing 10 of the slider 3, or between the bottom of the foam rubber of the sealing member 1a and the slideway belt 18 attached thereto. The spring element 60 behaves in a manner that the sealing member 1a increases in force to restore its initial shape after subjected to the deformation of expansion/collapse. Even if the foam rubber of the sealing member 1a were subjected to deterioration due to aging, moreover, any resilient force of the spring element 60 would aid the sealing member 1a to immediately restore its initial shape from the deformation of expansion/collapse, without leaving signs of the associated lateral wing 10 on the sealing member 1a. Thus, it will be expected that the resilient force of the spring element 60 works by improving the response of the sealing member 1a to the expansion/collapse, thereby raising the close engagement of the sealing member to other surfaces to make sure of high sealing performance. With the embodiments stated above in which the sealing member 1a has the spring element 60, even if the foam rubber of the sealing member 1a weakened in restoring force due to aging and so on, the resilient force inherent in the spring element 60 would assist the sealing member 1a to restore its initial shape from the deformation, thereby improving the response of the sealing member 1a to the expansion/collapse and also raising the close engagement of the sealing member 1a to other surfaces of any part or component such as the lateral wing 10, side wall 7, sensor rail 22 and so on, consequently making ensure highly reliable sealing performance.

Distinctions of the embodiments in FIGS. 12 and 14 to 17 will be recited below in comparison with the embodiments stated earlier with reference to FIGS. 4 to 7, 10 and 11.

Figure 1:
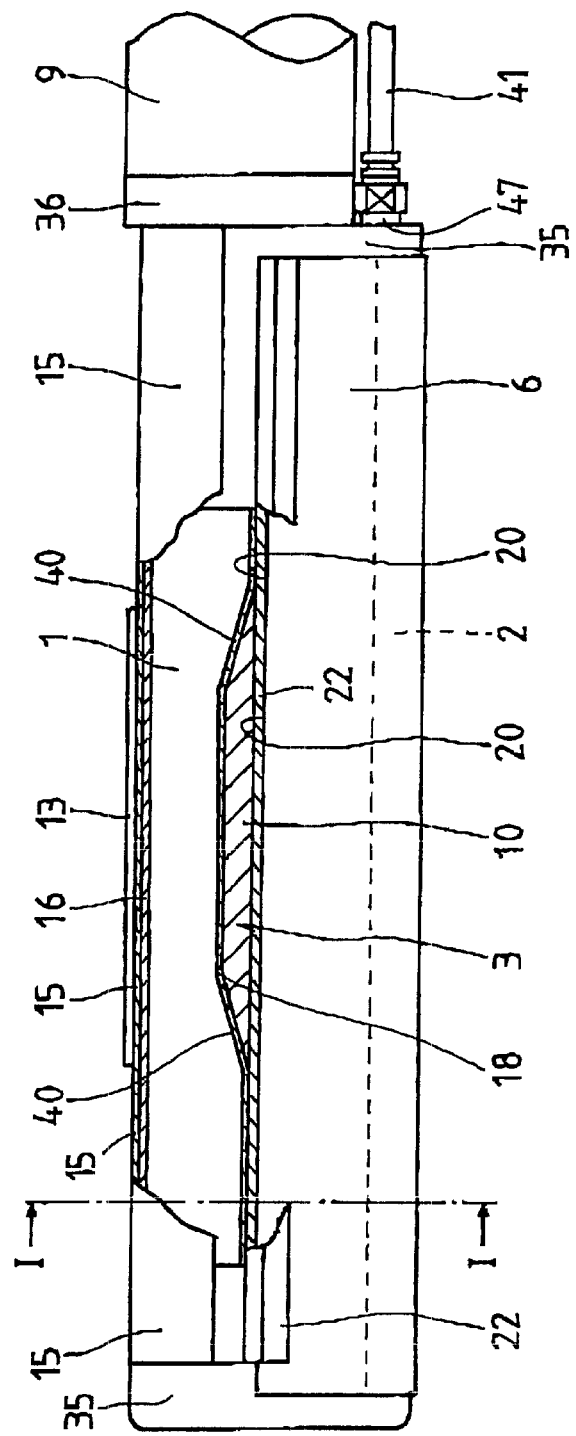
FIG. 1 is a front elevation view, partly broken away, showing a preferred embodiment of sealing means for a slider unit according to the present invention.
Figure 12:
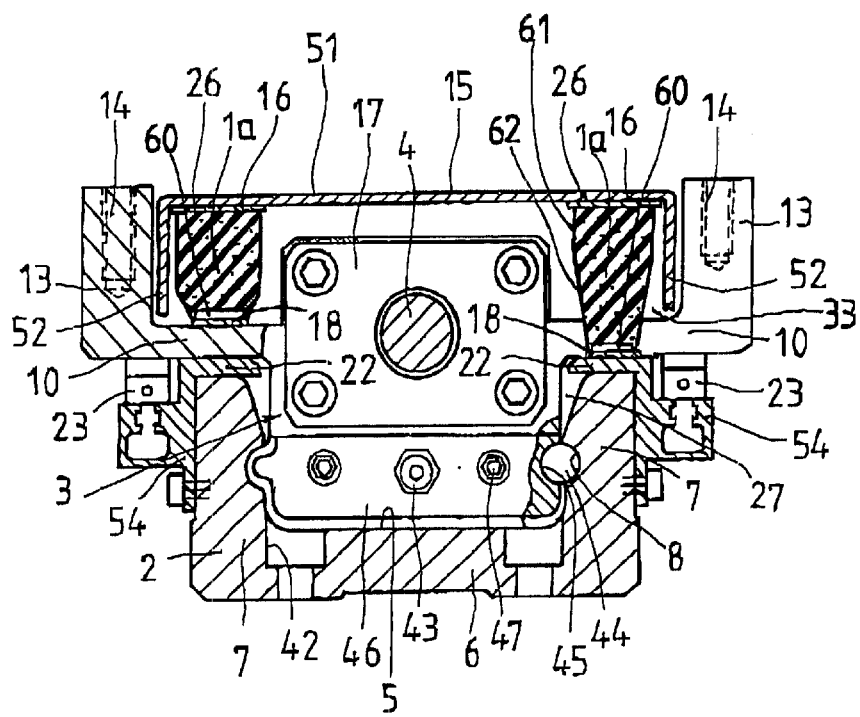
FIG. 12 is a cross sectional view showing a sixth embodiment of a sealing means similar to the first embodiment in FIG. 4, with taken on a plane corresponding to the line I—I in FIG. 1, but in which a sealing member is modified from that in FIG. 1.

(1) The sixth embodiment in FIG. 12 is equivalent to the first embodiment in FIG. 1 Instead of the sealing member 1, however, there is employed the modified sealing member 1a having the spring element 60 as shown in FIG. 13.

(2) The modified sealing member 1a, although but substantially equivalent to the sealing member 1 in FIG. 5, has the spring element 60, as opposed to the sealing member illustrated in FIG. 5

Figure 14:
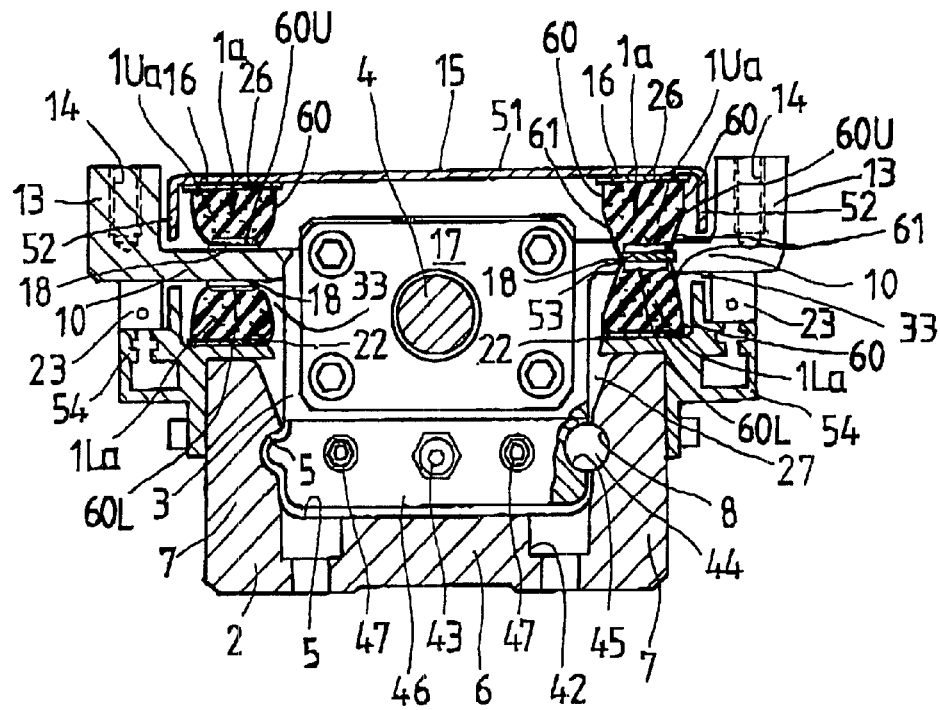
FIG. 14 is a traverse cross-section showing a seventh embodiment of a sealing means similar to the second embodiment in FIG. 6, with taken on a plane corresponding to the line I—I in FIG. 1.

(3) The seventh embodiment in FIG. 14 is equivalent to the second embodiment in FIG. 6. The seventh embodiment has incorporated with the modified sealing member 1a, which has the spring element 60, rather than the sealing member 1 in the second embodiment. In detail, the upper sealing half 1U in FIG. 6 is replaced with a modified upper sealing half 1Ua with an upper spring element 60U while a modified lower sealing half 1La with a lower spring element 60L substitutes for the lower sealing half 1L in FIG. 6.

Figure 7:
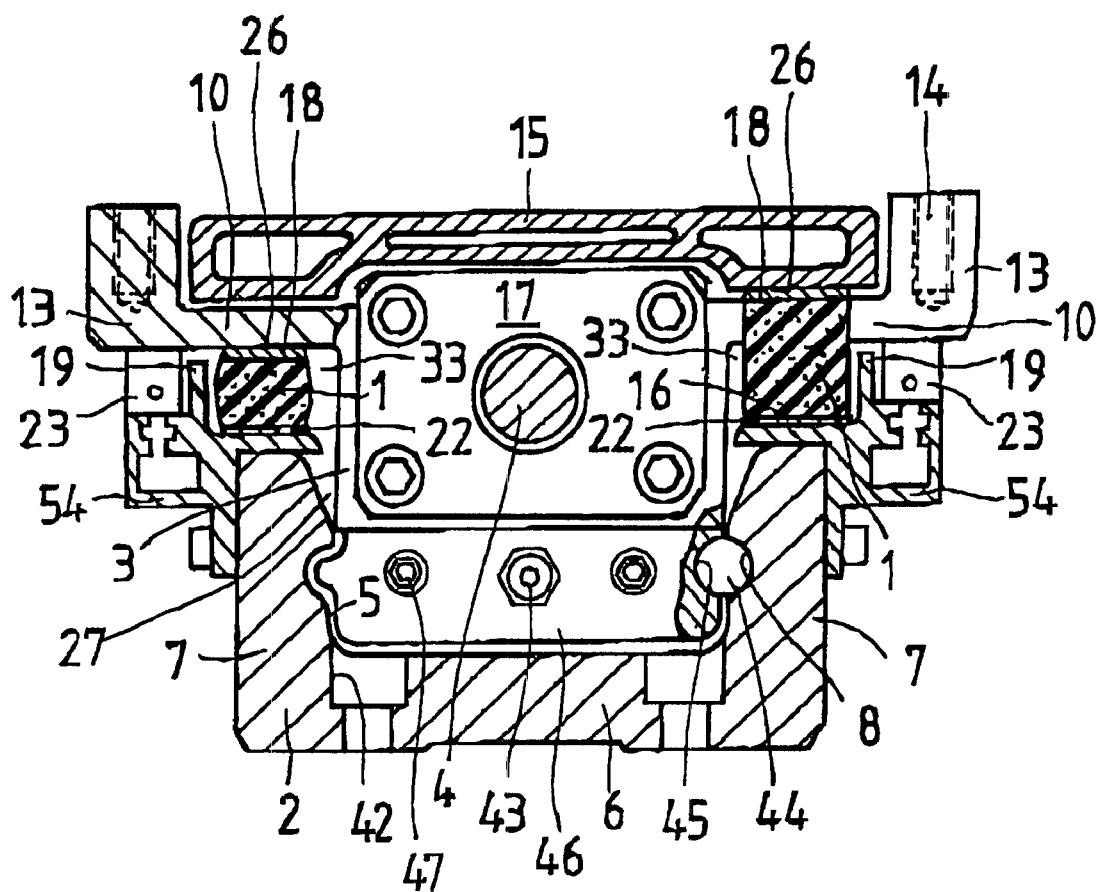
FIG. 7 is a traverse cross-section similar to FIG. 1 to show a third embodiment of a sealing means according to the present invention, with taken on a plane corresponding to the line I—I in FIG. 1.
Figure 15:
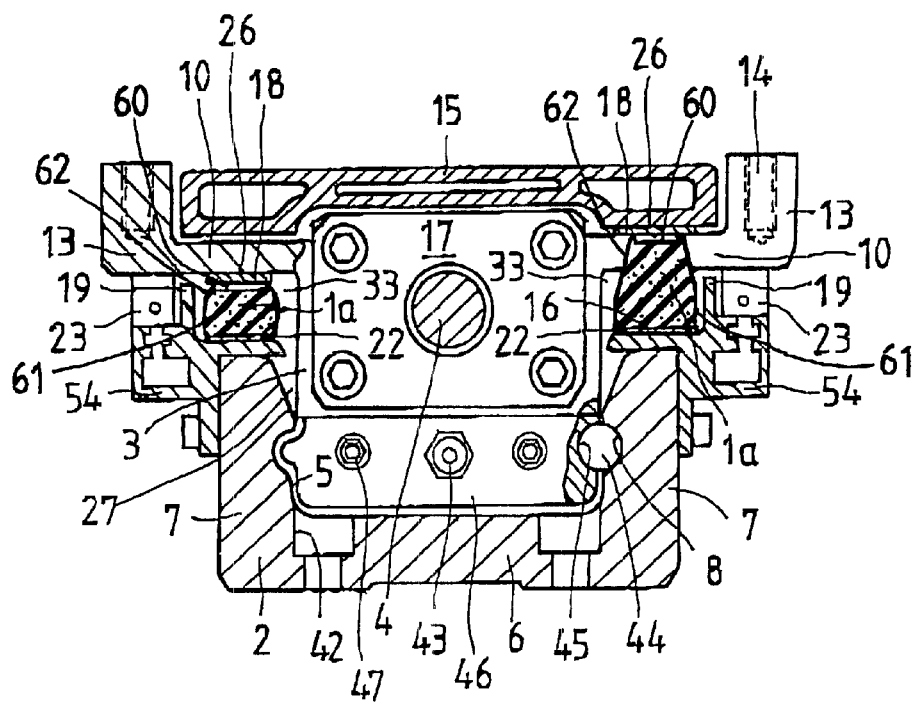
FIG. 15 is a traverse cross-section showing a eighth embodiment of a sealing means similar to the third embodiment in FIG. 7, with taken on a plane corresponding to the line I—I in FIG. 1.

(4) The eighth embodiment in FIG. 15 is equivalent to the third embodiment in FIG. 7. Instead of the sealing member 1 in the third embodiment, however, there is employed the modified sealing member 1a having the spring element 60.

Figure 16:
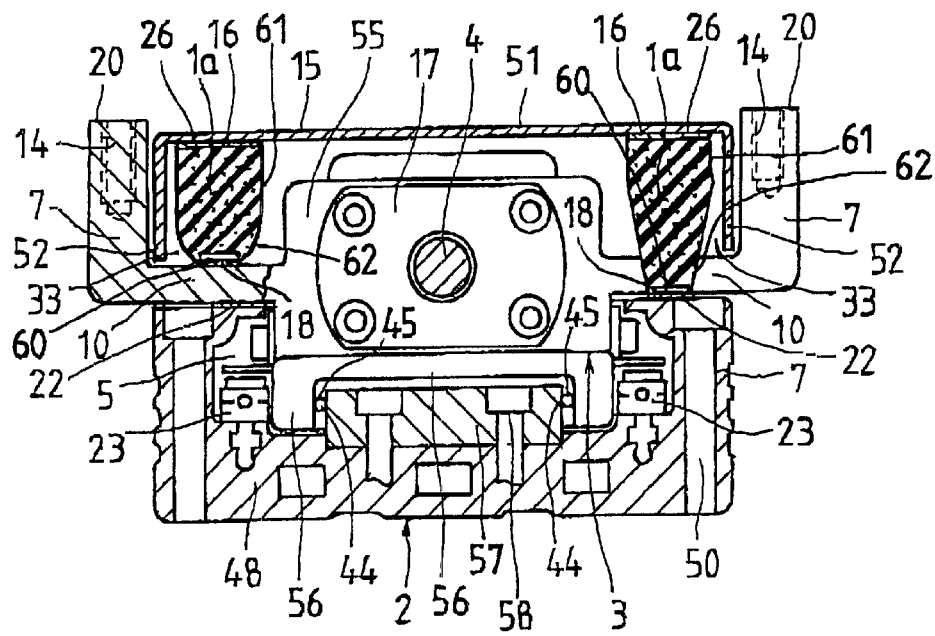
FIG. 16 is a traverse cross-section showing a ninth embodiment of a sealing means similar to the fourth embodiment in FIG. 10, with taken on a plane corresponding to the line I—I in FIG. 8.

(5) The ninth embodiment in FIG. 16 is equivalent to the fourth embodiment in FIG. 10. In this ninth embodiment, the modified sealing member 1a with the spring element 60 substitutes for the sealing member 1 in the fourth embodiment.

Figure 17:
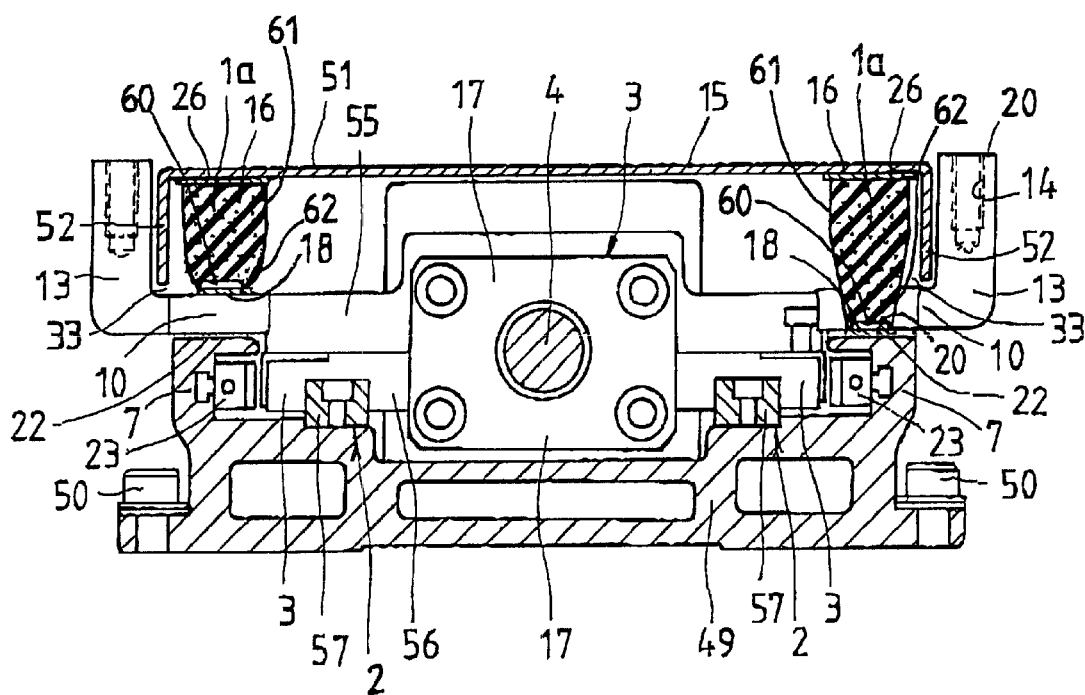
FIG. 17 is a traverse cross-section showing a tenth embodiment of a sealing means similar to the fifth embodiment in FIG. 11, with taken on a plane corresponding to the line II—II in FIG. 8.

(6) The tenth embodiment in FIG. 17 is equivalent to the fifth embodiment in FIG. 11. Instead of the sealing member 1 in the fifth embodiment, however, there is employed the modified sealing member 1a having the spring element 60.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A sealing means for a slider unit, comprising a track rail having a pair of lengthwise side walls opposing to each other widthwise of the track rail, a slider movable on the track rail, and a cover arranged over the track rail in a manner spanning between the side walls, wherein sidewise clearances are left open between the cover and the side walls of the track rail, each to each side wall, in a manner extending lengthwise of the track rail, the slider is made integrally with wings extending sideward from sides of the slider, each to each side, across the clearances and terminating in flanges turned upward, and sealing members of flexible, porous substance are arranged in the clearances between the side walls of the track rail and the cover to close the clearances, each to each clearance, in such a way that the sealing members are each fastened to any one of the associated side wall and the cover and allowed to experience any deformation of expansion/collapse, with keeping sliding engagement with the associated wing that pushes its way out the sealing member when the slider travels along the track rail.

2. A sealing means for a slider unit, constructed as defined in claim 1 wherein the sealing member is formed conforming to a contour of the clearance.

3. A sealing means for a slider unit, constructed as defined in claim 1 wherein the sealing member is made in a configuration of substantially quadrilateral in traverse cross-section, which experiences any deformation of expansion/collapse at place where the wing of the slider travels there.

4. A sealing means for a slider unit, constructed as defined in claim 1 wherein the sealing member is made in a traverse cross-section in which an area near a lengthwise surface to be fastened to any one of the side wall and the cover is made widthwise thick while a remaining area is reduced gradually in widthwise thickness towards an opposite surface, which will come into sliding engagement with the associated wing of the slider.

5. A sealing means for a slider unit, constructed as defined in claim 1 wherein the sealing member has a spring element to intensify a restoring force of the sealing member after subjected to any deformation of expansion/collapse occurring due to travelling of the wing of the slider, the spring element extending lengthwise along any side of the sealing member, which is brought into sliding contact with the wing of the slider.

6. A sealing means for a slider unit, constructed as defined in claim 1 wherein the sealing member is made of foam rubber.

7. A sealing means for a slider unit, constructed as defined in claim 6 wherein the foam rubber to provide the sealing member is coated with a protective skin.

8. A sealing means for a slider unit, constructed as defined in claim 1 wherein the sealing member has a fastener plate on a surface thereof to be secured to any one of the side wall and the cover.

9. A sealing means for a slider unit, constructed as defined in claim 1 wherein the sealing member has a wear proof slideway belt lengthwise on a surface thereof coming into sliding engagement with the associated wing of the slider.

10. A sealing means for a slider unit, constructed as defined in claim 1 wherein the wing of the slider has a wear proof slideway belt on a surface thereof coming into sealing member.

11. A sealing means for a slider unit, constructed as defined in claim 1 wherein the cover encloses a top surface of the sealing member to shield the sealing member.

12. A sealing means for a slider unit, constructed as defined in claim 1 wherein the cover is comprised of a roof to shield the top surfaces of the sealing members, and widthwise opposing side panels hanging from the lengthwise edges of the roof into gaps between the sidewise outsides of the sealing members and the flanges of the slider.

13. A sealing means for a slider unit, constructed as defined in claim 1 wherein the track rail includes a bottom integral with the side walls to be made in a trough opened upward.

14. A sealing means for a slider unit, constructed as defined in claim 1 wherein the slider is allowed to move back and forward with smoothness by virtue of rolling elements that run through load raceways defined between raceway grooves on widthwise opposite sides of the slider and raceway grooves on the sidewise opposing inside surfaces of the side walls.

15. A sealing means for a slider unit, constructed as defined in claim 1 wherein the sealing member is comprised of upper and lower sealing halves laid one on top of another, the upper half being fastened to the cover while the lower half being secured on the side wall, and the wing of the slider is arranged to move back and forward between the upper and lower sealing halves.

16. A sealing means for a slider unit, constructed as defined in claim 1 wherein the track rail is composed of a guideway member made with raceway grooves confronting raceway grooves on the slider to define load raceways between them to allow rolling elements to run through there, and a base frame has the side walls to hold the guideway member.

17. A sealing means for a slider unit, constructed as defined in claim 16 wherein a pair of the guideway members are spaced sidewise apart from one another and secured lengthwise to the base frame, while the slider is arranged to fit over the guideway members.

18. A sealing means for a slider unit, constructed as defined in claim 1 wherein the slider is comprised of a sliding part made with raceway grooves that cooperate with raceway grooves on the guideway member to define load raceways between them where rolling elements are allowed to run through there, and a carriage mounted on the sliding part and including the wings extending sideward and terminating in upward flanges.

* * * * *